United States Patent [19]

Buchholz et al.

[11] Patent Number: 5,360,465
[45] Date of Patent: Nov. 1, 1994

[54] PARTICULATE FERTILIZER DUST CONTROL

[75] Inventors: Richard F. Buchholz, Shelton; Dale W. Quinn, Gig Harbor, both of Wash.

[73] Assignee: Georgia-Pacific Corporation, Atlanta, Ga.

[21] Appl. No.: 999,657

[22] Filed: Dec. 29, 1992

Related U.S. Application Data

[63] Continuation of Ser. No. 414,015, Sep. 29, 1989, abandoned.

[51] Int. Cl.$^5$ .............................. C05G 3/10; C05C 9/00
[52] U.S. Cl. ................................. 71/11; 71/28; 71/64.07; 71/64.1
[58] Field of Search ..... 71/1, 11, 21-30, 64.07, 64.08, 64.13

[56] References Cited

U.S. PATENT DOCUMENTS

| | | | |
|---|---|---|---|
| 1,221,259 | 4/1917 | Woddrop | 106/38.8 |
| 1,311,219 | 7/1919 | Ellis | 106/123.1 |
| 2,495,148 | 1/1950 | Tanberg | 252/502 |
| 3,353,949 | 11/1967 | Naw | 71/64.07 |
| 3,635,684 | 1/1972 | Seymour | 44/576 |
| 3,697,245 | 10/1972 | Dilday | 71/28 |
| 3,725,029 | 4/1979 | Blackmore | 71/28 |
| 3,730,692 | 5/1973 | Holowaty et al. | 44/591 |
| 4,308,073 | 12/1981 | Mills | 106/473 |
| 4,587,358 | 5/1986 | Blouin | 564/3 |
| 4,704,230 | 11/1987 | Blackmore | 252/502 |
| 4,786,438 | 11/1988 | Blackmore | 252/510 |
| 4,846,871 | 7/1989 | Detroit | 71/25 |
| 5,238,480 | 8/1993 | Rehberg et al. | 71/28 |

FOREIGN PATENT DOCUMENTS

| | | |
|---|---|---|
| 3328742 | 2/1984 | Germany. |
| 1096265 | of 0000 | U.S.S.R. . |
| 916526 | 3/1982 | U.S.S.R. . |

OTHER PUBLICATIONS

"Fugitive Dust Control for Phosphate Fertilizer", Publication No. 01-015-069, Florida Institute of Phosphate Research (1988).
Mozheiko et al., *Klin. Pron–St.* (7), 409-10, (No Date).
Krutko et al., *Zh. Prikl. Khim.* 61(2), 394-97 (Abstract Only) (No Date).
Krutko et al., *Zh. Prikl. Khim.* 4, 718-21, 1987.
Department of Energy Topical Report, Feb. 26, 1982, entitled: "A Literature Review and Binder and Coal Selection for Research Studines on Coal Agglomeration", DOE/FE/05147-T3 (DE82011040).

*Primary Examiner*—Ferris Lander
*Attorney, Agent, or Firm*—Banner, Birch, McKie & Beckett

[57] ABSTRACT

Fugitive dust emission from granular inorganic fertilizers is controlled by applying a solution of urea and lignosulfonate.

11 Claims, No Drawings

PARTICULATE FERTILIZER DUST CONTROL

RELATED APPLICATION

This application is a continuation of U.S. Application serial No. 07/414,015, filed Sep. 29, 1989, now abandoned.

BACKGROUND OF THE INVENTION

1. Field of the Invention

The present invention pertains to a method for controlling fugitive dust emission from granular (particulate) fertilizers. The present invention is specifically directed to the use of an aqueous solution of a mixture of lignosulfonate and urea as a fugitive dust suppressant for granular fertilizers.

2. Description of Related Art

Fugitive dust emission from granular fertilizers has, in recent years, been an increasing concern because of the growing reliance on bulk handling of fertilizers, in preference to bags, and because of the heightened awareness of the potential health hazards of airborn dust. Dustiness, in large part, is due to inefficient removal of fines during fertilizer manufacture, poor granule strength, abrasion of fine surface crystals, and poorly adherent anticaking additives. As a consequence, a substantial amount of dust is created during handling and transportation of granular fertilizers.

Techniques are known for reducing the dustiness of prilled urea fertilizer. For example, it is known to add a small amount of formaldehyde to urea during urea manufacture to increase hardness. although safety and health concerns have limited this approach. Urea also has been treated with a small amount of lignosulfonate to increase its hardness, see U.S. Pat. No. 4,578,358. Numerous attempts to reduce dustiness of inorganic fertilizers, however, through improvements in the fertilizer manufacturing process, have been largely unsuccessful.

The benefits of lignosulfonate as a granulation aid have long been known in the fertilizer art. U.S. Pat. No. 3,725,029 discloses using a concentrated lignosulfonate solution as a binder for granulating ammonium sulfate. Recent U.S. Pat. No. 4,846,871 claims that the caking tendency and dustiness of inorganic fertilizers, including phosphates, nitrates and the like can be reduced by adding lignosulfonate during the granulation procedure to distribute it homogeneously throughout the fertilizer granules. Russian Patent 1,096,265 describes using an aqueous lignosulfonate-urea solution as a binder to consolidate a potassium chloride powder (dust) fraction and fine grain potassium chloride, assisted by mechanical pressing.

One of the most commonly used procedures for fertilizer dust control, especially for inorganic fertilizers, has been simply to spray the fertilizer with a small amount, generally about 0.5% by weight, of a petroleum oil to bind the dust to the granules. This treatment is only short-lived, because of evaporative loss of the oil, and cannot be used at all with high nitrate fertilizers (e.g., ammonium nitrate) because it creates an explosion hazard. Other liquids also have been used for fertilizer dust control including lignosulfonate solutions, amines, surfactants, waxes, wax emulsions and water alone, but have not proved completely satisfactory. One prevalent problem is that the use of aqueous treatment solutions tends to exacerbate the caking problem often encountered with inorganic fertilizers. Thus, there remains a need in the art for a treatment which effectively reduces the level of fugitive dust emission from inorganic fertilizers.

DESCRIPTION OF THE INVENTION

In accordance with the present invention, a method for reducing fugitive dust emission from granular, inorganic fertilizers is provided which comprises applying a dust reducing amount of an aqueous solution containing a mixture of urea and lignosulfonate to said granular inorganic fertilizers.

Because aqueous solutions of urea and lignosulfonate have a low volatility, they retain their effectiveness long after application. Moreover, since urea is a common fertilizer component and because lignosulfonates are approved as an animal feed additive, this treatment does not present any environmental problems. Contrary to other aqueous treatments, using aqueous solutions of urea and lignosulfonate to control fertilizer dust emission also has not exacerbated fertilizer caking.

As used throughout the specification and claims, the term "lignosulfonate" is intended to encompass both "sulfonated lignin" obtained by sulfonating alkali lignin, hydrolysis lignin and solvolysis lignin using for example sulfite or bisulfite compounds, and "sulfite lignin" obtained directly from the sulfite pulping of wood as a principle constituent of spent sulfite liquor. Alkali lignin is obtained from the alkaline pulping liquor (black liquor) of the Kraft, soda and other well-known alkaline pulping processes. Hydrolysis lignin is obtained from the hydrolysis of lignocellulose materials, and solvolysis lignin is obtained by solvent extraction techniques. Both hardwood and softwood lignins are suitable lignocellulose sources.

Lignosulfonates are available as salts with such cations as magnesium, calcium, sodium, potassium, ammonium, zinc, iron, copper and the like in either aqueous solution or in dried powder forms. The present invention does not require any particular source or form of lignosulfonate. For example spent sulfite liquor may be used directly or non-lignosulfonate constituents may be removed from any lignosulfonate source to a desired degree by various methods, such as by oxidation, dialysis or fermentation.

The inorganic fertilizers treated in accordance with the present invention include phosphates such as bone meal, ammonium phosphate, including monoammonium phosphate (MAP) and diammonium phosphate (DAP), and single and triple superphosphates, nitrates, such as ammonium nitrate and potassium nitrate, sulfates, such as ammonium sulfate, and potassium magnesium sulfate, chlorides such as potassium chloride, limestone, dolomite and mixtures thereof. The fertilizers may contain other constituents, such as urea. Methods of manufacturing these inorganic fertilizers are well-known to those skilled in the fertilizer art, as are the methods for processing these fertilizers into particles or granules using well known prill and/or granulation techniques. Granular micronutrients also can be treated in accordance with the present invention.

For example, when conventionally producing granular ammonium phosphate, phosphoric acid is neutralized with ammonia in a series of ammoniarich reaction tanks where the heat of reaction evaporates a part of the water introduced with the acid. The extent of ammoniation is controlled to yield a slurry composition ranging from monoammonium phosphate to ardour two-thirds diammonium phosphate, depending on the grade of product desired. This slurry flows to a pugmill or blunger in which it is granulated by mixing with recycled product fines. The granules are then dried and screened to provide a product fraction and a finer recycle fraction. Recycle rations in the order of 8:1 are required for proper control of granulation. In one variation of the process, a rotary drum granulator is substituted for the blunger. Products made in this manner typically contain 11% N and 21% P. predominantly monoammonium phosphate; and 16% N and 21% P, about one-third monoammonium and two-thirds diammonium phosphate. Other grades such as one containing 16% N and 8.7% P and another with 13% N and 17% P may be made by adding sulfuric acid to the ammoniators, in which case the product also contains ammonium sulfate. In still another variation, unfiltered extract from a phosphoric acid plant is used to produce lower grades that contain calcium sulfate.

Diammonium phosphate containing 18% N and 20.1% P is also made by a process in which phosphoric acid is neutralized with ammonia in a rotary drum granulator. Heated air and dry recycled fines are introduced in the granulator to reduce the moisture content to the proper level for granulation. The gases leaving the granulator are scrubbed with the incoming acid. The product is dried and then screened.

An alternate process for a material containing 18% N and 20.1% P also uses a rotary granulation drum. Phosphoric acid is neutralized in a prereactor with anhydrous ammonia to an $NH_3:H_3PO_4$ mole ratio of about 1.3, a point near the maximum solubility of the process. The slurry is fed to the granulator along with recycled fines. Additional ammonia is added in the granulation step to give a mole ratio of about 2. a point of minimum solubility. The excess ammonia required to drive the reaction to diammonium phosphate is recovered by scrubbing the exhaust gases with the incoming acid before it is fed to the prereactor. The product from the granulator is dried and screened. In addition to the material containing 18% N and 20.1% P, a large variety of grades rich in diammonium phosphate can be conventionally produced by neutralizing with ammonia-ammonium nitrate solutions rather than anhydrous ammonia, substituting sulfuric acid for part of the phosphoric acid, or adding various solid fertilizer ingredients to the ammoniator.

Ammonium nitrate may be conventionally produced in granular form substantially as described by the above processes by initially starting with the neutralization of nitric acid with ammonia in the ammoniation reaction tanks. Similarly, potassium nitrate may be conventionally produced in granular form from potassium chloride and sodium nitrate while ammonium phosphate may be conventionally produced in granular form from ammonia and phosphoric acid.

Granular inorganic fertilizers produced by these and other procedures, well known, to those skilled in the art, such as crystallization techniques or fertilizers which are recovered naturally in a granular form can be treated to reduce fugitive dust emission in accordance with the method of the present invention.

The method of the present invention generally is used to reduce fugitive dust emission from granulated (particulate) inorganic fertilizers, i.e., fertilizers having the bulk (more than 50 weight percent) of their particles greater than about 35 mesh and usually greater than about 28 mesh (Tyler Sieve Size), which contain significant amounts of fine particulates. i.e., particles with a size below about 100 mesh (i.e., below about 150 microns) and particularly with a size below about 150 mesh (i.e.. below about 100 microns) (Tyler Sieve Size). Fertilizers which are especially prone to fugitive dust emission during handling are those containing above about 0.05%, and especially above about 2.0%, by weight of such fines.

According to the method of the present invention, an effective dust reducing amount of an aqueous solution of a mixture of urea and lignosulfonate is applied, e.g., simply by spraying, to a granular, inorganic fertilizer containing fine particles in order to reduce the level of fugitive dust emission from the fertilizer.

The aqueous urea and lignosulfonate solution can be prepared simply by dissolving urea in a lignosulfonate solution. Adding urea to an aqueous lignosulfonate solution produces a viscosity reduction in the solution. Consequently, solutions of higher solids contents can be prepared and effectively applied using a mixture of urea and lignosulfonate, then can be done using lignosulfonate alone. Suitable solutions will contain about 45 to 80% solids. If the solids content of the solution is too low, excess water in the solution may create a caking problem for the treated fertilizer: while at high solids contents the solution may be too viscous to apply effectively. Preferably a solution with a solids content between about 50 to 65% will be used.

The solution should contain at least about 0.3 part and up to about 40 parrs by weight, and more preferably between about 0.5 part and 10 parts by weight, lignosulfonate per part by weight urea. Because lignosulfonate is less expensive than urea, it is preferred to use solutions containing the least amount of urea needed to enhance fertilizer dust suppression.

The aqueous solution can also include other constituents such as fertilizer supplements, including sulfur, pesticides, selective herbicides and micronutrients. Micronutrient elements are considered to include iron, manganese, molybdenum, boron, copper, and zinc. These elements normally are supplied in their oxide or salt forms. Suitable salts include the sulfate, nitrates, chlorides, molybdates and borates.

The aqueous solution can be applied to the granular inorganic fertilizer using any suitable technique, such as by spraying, sprinkling, or by brushing. Generally, the aqueous solution is applied by spraying in an amount to provide about 0.05 to 5.0 parrs urea and lignosulfonate solids per 100 parts fertilizer solids, preferably between about 0.1 to 3.0 parts of the dry mixture per 100 parts of fertilizer. Normally this level of treatment can be obtained by applying about 0.2 to 5.0 weight percent of an aqueous solution onto the granular fertilizer.

The aqueous solution usually is applied to the fertilizer, e.g. by spraying, at some point after granulation or prilling, for example by spraying onto a rolling bed of the granular fertilizer, such as in a rotary coating drum or mixer. Alternate methods might involve spraying in screw conveyors, on belt conveyors or at any other material transfer point where reasonable coverage of the fertilizer can be obtained. In a bulk blending operation, the solution can be applied through a spray nozzle or sprayer in the mixer. Finally, it is possible to spray the solution into the fertilizer in the granulator itself at the end of the granulation process. Other ways of obtaining good coverage of the particulate fertilizer with the aqueous dust suppressant solution will be apparent to those skilled in the art and can be used in connection with the present invention.

The following examples are provided for illustration and are not intended as a limitation on the scope of the present invention.

EXAMPLE 1

Separate 450 gram samples of a granular triple superphosphate fertilizer (commercial designation 0-46-0), containing 5.3% by weight fines (particle size less than 150 mesh), were sprayed with various aqueous solutions of urea and lignosulfonate using a Wagner power sprayer. The granular fertilizer was rotated in a pan granulator during spraying. Three different aqueous solutions were used. Solution A contained 40% by weight Ca lignosulfonate solids and 20% by weight urea. Solution B contained 40% by weight Ca lignosulfonate solids and 10% by weight urea. Solution C contained 35% by weight Ca lignosulfonate solids and 30% by weight urea. The granular fertilizer was sprayed with between 0.25 to 1.5 parts by weight of urea and lignosulfonate solids per 100 parts fertilizer. The level of dusting was determined by measuring the mass of particles passing through a 60 mesh screen after treatment. The results are presented below in Table 1.

TABLE 1

|  | Level of Dusting @ Application Level of | | |
| --- | --- | --- | --- |
|  | 0.25% | 1.0% | 1.5% |
| Solution A | 4.7 | 2.7 | 0.7 |
| Solution B | 4.9 | 2.4 | 0.9 |
| Solution C | 3.5 | 2.6 | 0.5 |

EXAMPLE 2

A commercial sample of a granular potassium sulfate (about 550 grams) was split into two portions. One portion was screened "as is" to determine its particle size distribution; while the other portion first was treated with Solution C (Example 1) in an amount of 1 part Solution C per 100 parts potassium sulfate, and then screened. The results are reported below in Table 2.

TABLE 2

|  | Particle Size | | |
| --- | --- | --- | --- |
|  | % less than 20 mesh | % between 6 mesh and 20 mesh | % greater than 6 mesh |
| Untreated Control | 1.8 | 96.4 | 1.8 |
| Treated Sample | 0.4 | 98.2 | 1.4 |

EXAMPLE 3

The particle size distribution of a raw granular potassium magnesium sulfate fertilizer was determined by sieving. A portion of the fertilizer was treated with Solution C (Example 1) in an amount of 1 part Solution C per 100 parts fertilizer and then screened. The results are reported below in Table 3.

TABLE 3

|  | Particle Size | | |
| --- | --- | --- | --- |
|  | % less than 20 mesh | % between 6 mesh and 20 mesh | % greater than 6 mesh |
| Untreated Control | 3.3 | 62.9 | 33.8 |
| Treated Sample | 1.3 | 62.3 | 36.4 |

EXAMPLE 4

Separate 400 gram samples (5) of a granular triple superphosphate fertilizer were heated in a rotating drum to about 95° C. Three samples were sprayed with various aqueous solutions of urea and lignosulfonate, one sample was treated with water alone and another was untreated. Three different aqueous solutions were used. Solution D contained about 35% by weight Ca lignosulfonate solids and about 30% by weight urea. Solution E contained about 39% by weight Ca lignosulfonate solids and about 20% by weight urea. Solution F contained about 41% by weight Ca lignosulfonate solids and about 9% by weight urea. The granular fertilizer was sprayed with about 4 parts of urea and lignosulfonate solids per 100 parts fertilizer. In the water-only treatment about 2 parts water was used per 100 parts fertilizer. The level of dusting of 200 gram portions of the five treated samples and one untreated sample was determined by measuring the mass of particles passing through a 60 mesh screen after the samples were tumbled overnight. The results are presented below in Table 4.

TABLE 4

| Sample | % less than 60 mesh |
| --- | --- |
| Untreated Control | 0.018 |
| Heated Control | 0.032 |
| Water Only | 0.024 |
| Solution D | 0.007 |
| Solution E | 0.004 |
| Solution F | 0.002 |

While certain specific embodiments of the invention have been described with particularity herein, it will be recognized that various modifications thereof will occur to those skilled in the art, and it is to be understood that such modifications and variations are to be included within the purview of this application and the spirit and scope of the appended claims.

We claim:

1. A method for reducing dust emissions from granular inorganic fertilizers which comprises applying to the granular inorganic fertilizer a dust reducing amount of an aqueous solution containing a mixture of urea and lignosulfonate solids,
    wherein the granular inorganic fertilizer is selected from the group consisting of nitrates, phosphates, sulfates, limestones dolomite and mixtures thereof.

2. The method of claim 1 wherein said dust reducing amount comprises from about 0.05 part by weight to about 5.0 parts by weight urea and lignosulfonate solids per 100 parts by weight of said fertilizer.

3. The method of claims 1 or 2 wherein said aqueous solution contains between about 45% to 80% by weight solids.

4. The method of claim 3 wherein said mixture contains at least about 0.3 part by weight up to about 40 parts by weight lignosulfonate per part by weight urea.

5. The method of claim 4 wherein said lignosulfonate is selected from the group consisting of sulfite lignin and a sulfonated lignin.

6. The method of claim 4 wherein said granular inorganic fertilizer contains at least 0.05% by weight of particles less than 100 mesh.

7. The method of claim 1 wherein said lignosulfonate is selected from the group consisting of sulfite lignin and a sulfonated lignin.

8. The method of claim 1 wherein said granular inorganic fertilizer contains at least 0.05% by weight of particles less than 100 mesh.

9. The method of claim 1 wherein said granular inorganic fertilizer contains at least 2.0% by weight of particles less than 100 mesh.

10. The method of claim 9 wherein said inorganic fertilizer is selected from the group consisting of ammonium nitrate, ammonium phosphate, ammonium sulfate, potassium nitrate, potassium sulfate, potassium magnesium sulfate, bone meal, triple superphosphate, single superphosphate, limestone, dolomite and mixtures thereof.

11. The method of claim 1 wherein said inorganic fertilizer is selected from the group consisting of ammonium nitrate, ammonium phosphate, ammonium sulfate, potassium nitrate, potassium sulfate, potassium magnesium sulfate, bone meal, triple superphosphate, single superphosphate, limestone, dolomite and mixtures thereof.

* * * * *